United States Patent

[11] 3,602,794

[72] Inventor  Lawrence A. Westhaver
              13001 Old Stagecoach Road, Laurel, Md. 20810
[21] Appl. No. 49,807
[22] Filed     June 25, 1970
[45] Patented  Aug. 31, 1971

[54] SOLID STATE CHARGING CIRCUITRY USING A LOADING COIL
     5 Claims, 4 Drawing Figs.
[52] U.S. Cl. .................................................. 320/39,
                                    320/22, 323/4, 323/22 T
[51] Int. Cl. ........................................................ H02j 7/04
[50] Field of Search .......................................... 320/39, 40,
                                    22; 323/4, 18, 22 T, 22

[56]              References Cited
              UNITED STATES PATENTS
3,348,118  10/1967  Watrous ........................  320/40 X
3,475,675  10/1969  Ruposa ..........................  323/18
3,378,758  4/1968   Goodenow ....................   323/18
3,363,162  1/1968   Bawden ..........................  320/39 X 3,068,392  12/1962  Santelman, Jr. ..............  323/PW UX Primary Examiner—William H. Beha, Jr.
Assistant Examiner—John M. Gunther
Attorney—David H. Semmes ABSTRACT: Self-regulating solid state battery charging circuitry which automatically provides a rippled constant mean fast charge current irrespective of the condition of the battery and automatically changes to a rippled constant mean trickle charge current in response to a near-full-charge battery voltage. On-off triggering of the supply occurs in response to error signals from a current sensing resistance which is in series with the battery and with a low-loss loading coil, the battery receiving current from the energized loading coil through a diode and through the current sensing resistance during off intervals of the supply to thereby achieve high efficiency. Only the frequency and shape of the current ripples change as the battery becomes charged. In response to a near-full-charge battery voltage the current sensing resistance is increased about 10-fold, resulting in a 10-fold reduction in charging current and a 10-fold increase in frequency of the current ripples.

INVENTOR
LAWRENCE A. WESTHAVER

3,602,794

SOLID STATE CHARGING CIRCUITRY USING A LOADING COIL

BACKGROUND OF THE INVENTION

1. Field of the Invention

Known types of battery charging circuits have been designed to charge at constant voltage or to charge at constant current. The present invention is of the latter type and provides solid state controls to maintain a constant means fast charge current or a constant mean trickle charge current irrespective of relatively large variations in the supply voltage. Further, the mean fast charge current is maintained constant by the present invention irrespective of the condition of the battery, such as the number of cells, a short circuit of one or more cells, and the degree of charge of the cells. Upon reaching a near-full charge battery voltage the present invention provides automatic change to a constant mean trickle charge current for as long as the battery voltage is maintained. The invention is especially suited to meet the requirements for safe and efficient charging of nickle-cadmium batteries although useful in charging all types of secondary batteries.

The object of the invention is to provide battery charging circuitry with minimum resistance in the charging circuits to thereby minimize $I^2R$ losses.

Another object is to provide battery charging circuitry which charges at a constant mean fast charge current irrespective of the condition of the battery.

A further object is to provide battery charging circuitry which automatically reduces the fast charge current to a trickle charge current in response to near-full-charge battery voltage.

A still further object of the invention is to provide efficient yet versatile battery charging circuitry which provides a constant mean fast charge current irrespective of the condition of the voltage rating of the battery and which requires adjustment only of the battery voltage sensing control to change to trickle charge current when the battery voltage approaches its rating.

2. The Prior Art
Burgess   3,310,729
Hoffmann  3,443,195
Gallaher  3,350,628.

DESCRIPTION OF THE PREFERRED EMBODIMENTS

Figure 1:
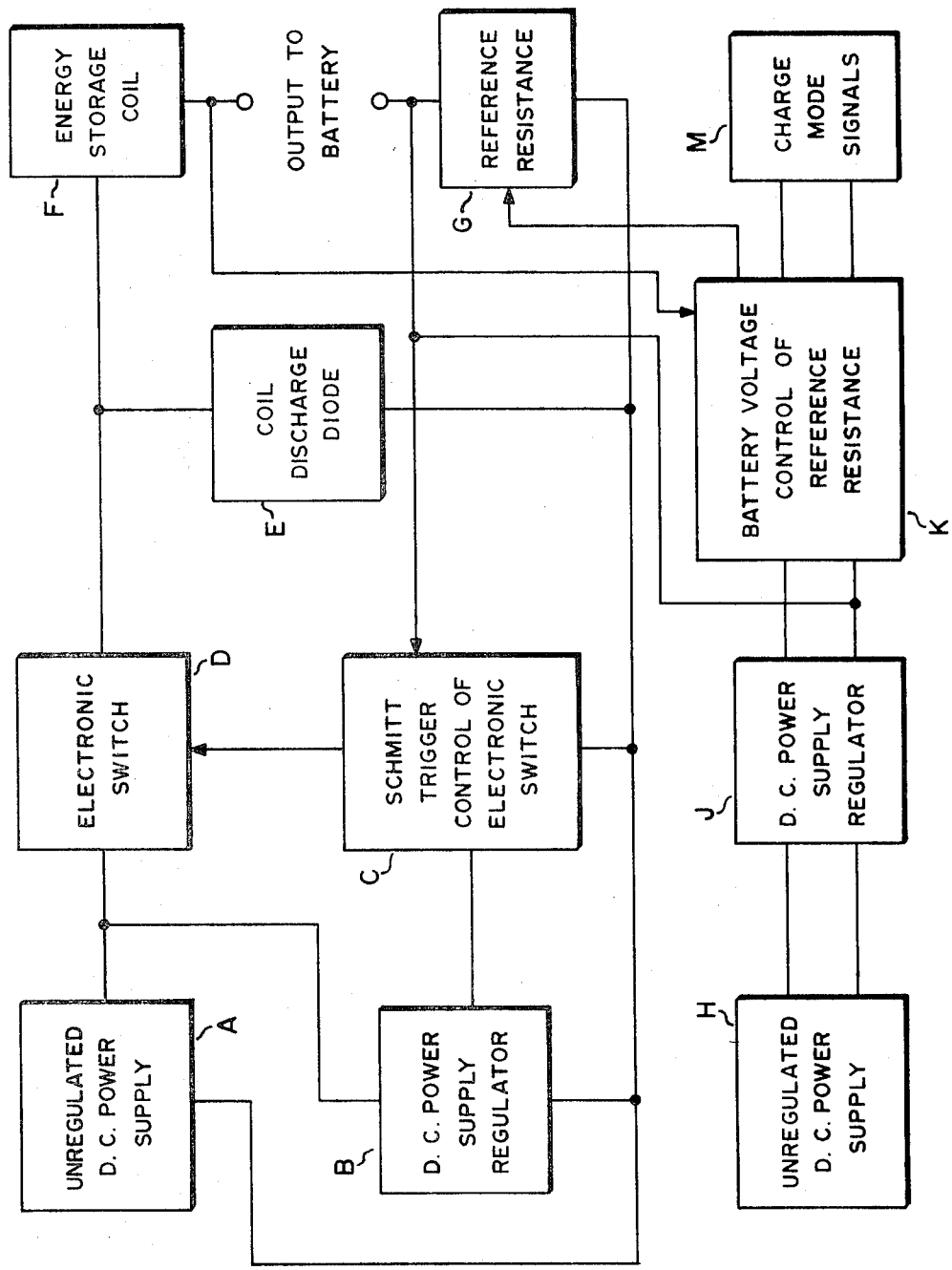
FIG. 1 is a schematic functional diagram of the invention.
Figure 3:
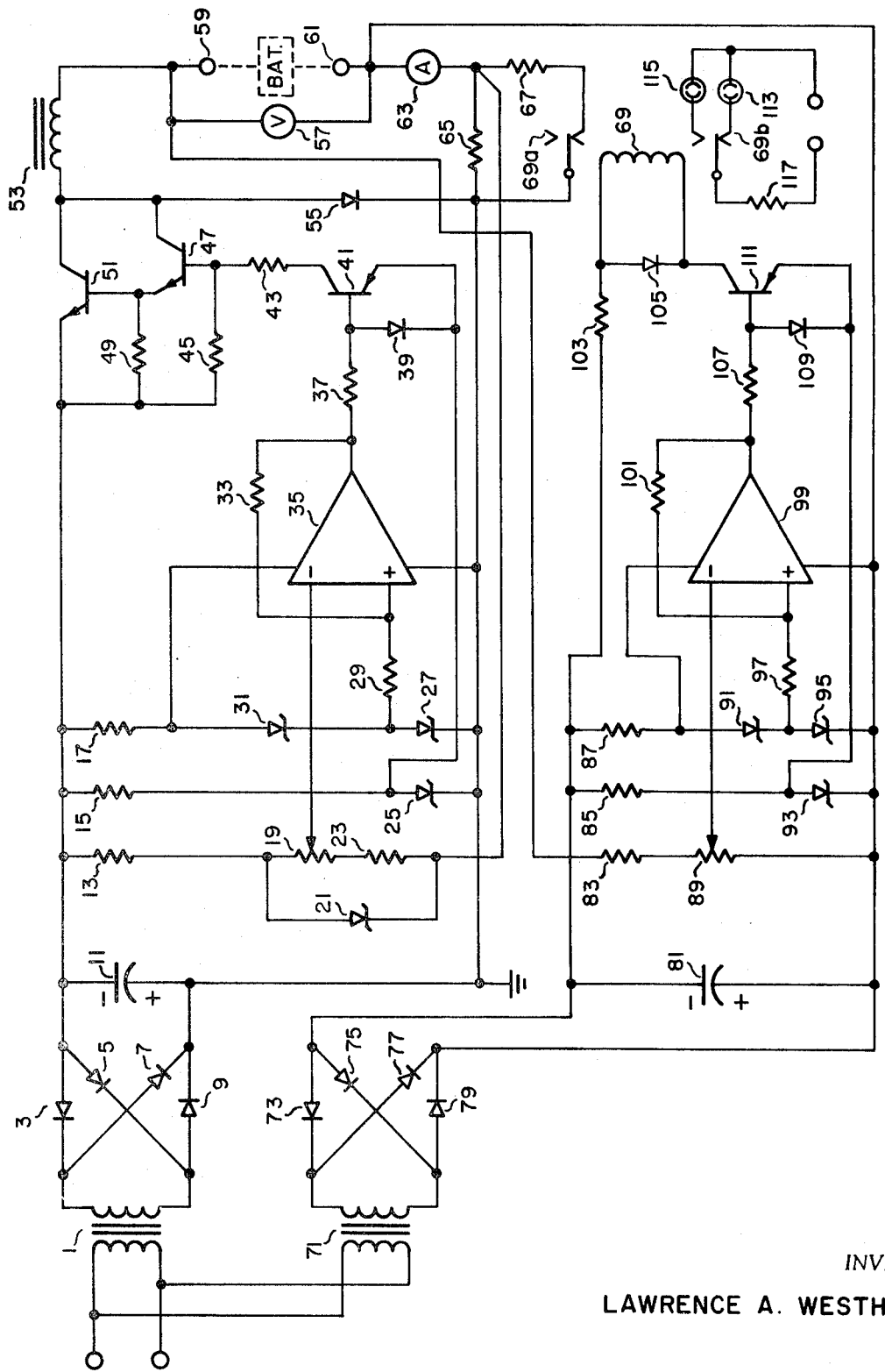
FIG. 3 shows an example of detailed circuitry suitable to achieve the objects of the invention.

Referring to FIG. 1, the invention is represented by its component subcircuits, the details of which may take the form illustrated in FIG. 3.

An unregulated DC Power supply A is in series with electronic switch D, an energy storage or loading coil F, the battery under charge and a reference resistance G. This loop forms the first charging circuit when electronic switch D is closed. This first loop also serves to energize the energy storage coil F.

After the charging current has reached a certain magnitude in the first loop, the electronic switch D is opened and a second circuit loop forming a second charging circuit will permit the energy storage coil F to discharge to continue uninterrupted the charging of the battery. This second loop consists of the battery under charge, the reference resistance G and the coil discharge diode E in series with the energy storage coil F which in discharging tends to maintain the charging current through the battery.

The electronic switch D is controlled by Schmitt trigger circuit C. The DC power supply regulator B, supplied by unregulated DC power supply A, provides stable supply and reference voltages to the Schmitt trigger control circuit C. The small voltage drop across reference resistance G will be proportional to the charging current. It is the magnitude of this voltage, applied to the input of the Schmitt trigger circuit, that determines whether the electronic switch D is to be opened or closed.

With the electronic switch D closed the voltage drop across reference resistance G will increase exponentially. When this voltage reaches a certain point the Schmitt trigger C switches off electronic switch D. At that point the voltage drop across reference resistance G will start to decrease exponentially as the energy storage coil F discharges. When a specific lower voltage is reached, the Schmitt trigger will switch the electronic switch closed and the cycle will be repeated. The difference between the voltage inputs necessary to change the Schmitt trigger from one output state to the other is the input hysteresis of the circuit.

A second independent unregulated DC power supply H drives DC power supply regulator J. The regulator provides stable supply and reference voltages to the battery voltage responsive circuit K which controls reference resistance G.

A nickle-cadmium vented cell, under constant current charge, exhibits a distinct voltage increase prior to its reaching full charge: usually 1.5 to 1.65 volts. This voltage increase may be sensed to switch the charger from full-charge to trickle-charge current. Similarly a decrease in cell voltage may be sensed to switch the charger back to full-charge current.

Battery voltage responsive control K operates to increase the value of the reference resistance G by 10-fold when the voltage of the battery under charge indicates it is nearly a fully charged condition.

In the specific embodiment of the invention the battery voltage responsive control circuit K will have a hysteresis which will switch the charger from full-charge current to trickle-charge current when the voltage per cell equals 1.5 volts and back to full-charge current when the voltage per cell drops to 1.4 volts. These voltages, used for nickle-cadmium batteries, may be changed to accommodate other battery systems.

Controlled by battery voltage responsive circuit K, the charge mode signals M indicate whether the charger is providing full or trickle charge current.

In the present invention, reference resistance G is chosen to be as small as is practical for full charge. The value chosen will be increased 10-fold for trickle charging. Energy storage coil F is also designed to have the least practical resistance.

High efficiency is thus obtained, since the $I^2R$ losses of the charging circuit are small compared to the power supplied to the battery.

The frequency of operation of the electronic switch D depends on the supply voltage from A, the voltage of the battery, the total loop resistance: principally G and F, the inductance of coil F, the forward voltage drop of coil discharge diode E and the input hysteresis of Schmitt trigger control circuit C. Nevertheless, the mean charging current established by the circuit parameters will be maintained relatively constant by the present invention and only the shape and frequency of the current ripple change with a change in supply or battery voltage.

The novelty of the present invention resides in the combination of the two charging circuits controlled by a common current sensing resistance in the manner as above described. The arrangement of a loading coil and diode supply a DC current to a load during cut off periods of the supply is known to the art and illustrated in U.S. Pat. Nos. 3,310,729 and 3,443,195. The arrangement of a Schmitt trigger to control a switch in a load circuit in response to error signals from a current sensing resistance is also known to the art as illustrated in U.S. Pat. No. 3,350,628.

Consider for example the charging of a nickle-cadmium battery having a near-full-charge voltage of 36 volts using a DC supply 50 volts, a coil F having inductance L of 30 millihenrys and 0.2 ohm resistance, using a reference resistance G of 0.125 ohm for fast charge and 1.25 ohm for trickle charge. Other factors are negligible.

Assume that the system starts operating at a constant mean fast charge of 8.0 amps and trigger voltage of 0.1 volts, i.e., from 0.05 volt above the mean to 0.05 volt below the mean, or vice versa. The mean IR drop in G is 8.0×0.125=1.0 volt and in F is 8.0×0.2=1.6 volt. At the instant when D closes, the voltage $V_{L1}$ imposed on the inductance of the coil is 50−$V_b$ −2.6, where $V_b$ is the battery voltage.

The voltage $V_{L1}$ applied to the inductance L is related to the rate of change of current by $V_{L1} = L di/dt_1$  (1)

so that $dt_1 = L di / V_{L1} di/dt_{L1}$  (2)

For small charges of current relative to the mean of 8.0 amps, the change $di$ may be considered as the current increase during on time of switch D and the current decrease during off time of switch D, and $dt_1$ may be considered the on time of switch D.

If the battery is completely discharged, $V_b$ will be zero and $V_{L1}$ will therefore be 47.4 volts. The value of $di$ will be that current change necessary to raise the voltage across G by the trigger voltage of 0.1 volt, namely 0.1/0.125=0.8 amp.

With these values, the value of $dt_1$ from formula (2) is 30×10$^1$×0.8/47.4=5.1×10$^{14}$ seconds.

The switch D now opens and the voltage $V_{L2}$ produced by the inductance L of the coil is $V_{L2} = -L di/dt_2$,  (3)

so that $dt_2 = -di/V_{L2}$,  (4)

where $dt_2$ is the off-time of switch D.

The voltage $V_{L2}$ will instantly assume a value sufficient to overcome the 2.6 volt drop in G and F and the battery voltage. Assuming the latter is still zero, $V_{L2}$ will be 2.6 volts. The value of $di$ sufficient to cause a 0.1 trigger voltage is now −0.8 amp. The value of $dt_2$ from formula (4) is therefore 30×10$^{13}$×0.8/ 2.6=9.2×10$^{13}$ seconds. The cycle time for on-off of switch D is $dt_1+dt_2$=5.1×10$^{14}$+9.2×10$^{13}$=9.7×10$^{13}$ seconds, and the frequency of the current ripple for the uncharged battery is 1/9.7×10$^{bh13}$=103 cycles per second.

As the battery voltage builds up, the values of $V_{L1}$ and $V_{L2}$, and in consequence the values of $dt_1$ and $dt_2$, become less disparate. The following table for the foregoing example gives the calculated values as the battery voltage rises to near rated voltage under fast charge:

| Battery Voltage, Vb | On Time of Switch D (secs.) | Off Time of Switch D (secs.) | Cycle Frequency (cycles/sec.) |
|---|---|---|---|
| 0 | 5.1×10$^{14}$ | 9.2×10$^{13}$ | 103 |
| 5 | 5.7×10$^{14}$ | 3.2×10$^{13}$ | 265 |
| 22.4 | 9.6×10$^{14}$ | 9.6×10$^{14}$ | 521 |
| 25 | 1.07×10$^{13}$ | 8.7×10$^{14}$ | 515 |
| 36 | 2.1×10$^{13}$ | 6.5×10$^{14}$ | 363 |

Upon response to a near-full-charge battery voltage of 36 volts, the control K operates to increase the resistance of G 10-fold to 1.25 ohms to reduce the constant mean current to 0.8 amps. The current charge $di$ necessary to produce 0.1 trigger voltage is now 0.1/1.25=0.08 amp or one-tenth of that for the fast charge. The intervals $dt_1$ and $dt_2$ are therefore reduced to one-tenth and the frequency increased 10-fold to 3,630 cycles per second for trickle charge.

Figure 2:
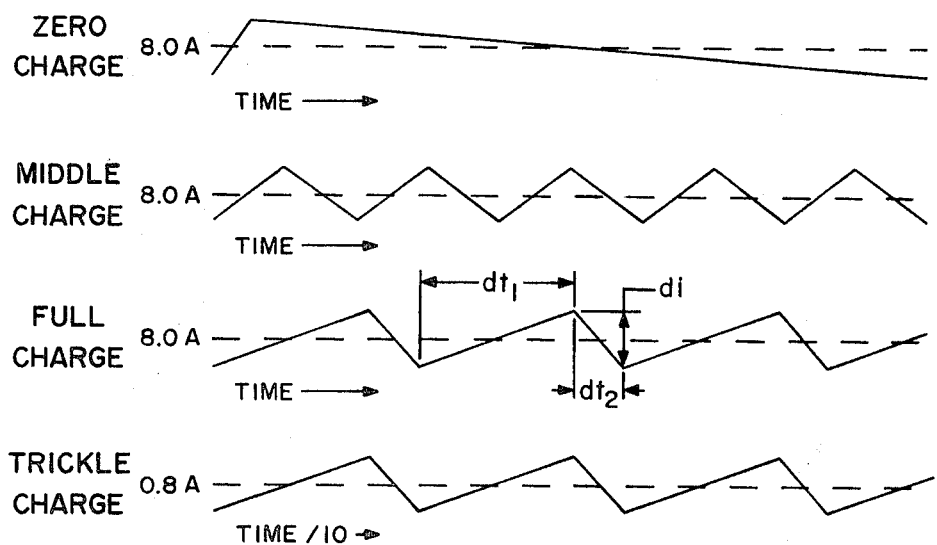
FIG. 2 shows an example of the form and frequency of the current ripples during three periods of fast charge and during trickle charge thereafter.

FIG. 2 illustrates the calculated current ripples for the foregoing example beginning with a relatively uncharged battery on fast charge, through intermediate and final periods of fast charge, and ending with an indefinite period of trickle charge. The values of $dt_1$, $dt_2$ and $di$ are indicated for the final fast charge period. An oscilloscope examination of the current ripples for this example has confirmed the correctness of the calculated values represented in FIG. 2.

As explained for the detailed circuitry of FIG. 3, the level of current, relative to which the Schmitt trigger C responds, can be adjusted and the level of voltage to which the control K responds can also be adjusted, to adapt the system for higher or lower mean constant fast charge current and for batteries of different voltage ratings than assumed in the foregoing example.

Transformer 1 supplied by unregulated 117 volts AC has its output rectified by diodes 3, 5, 7 and 9 and filtered by capacitor 11. The unregulated DC supply thus formed has its positive side grounded.

When switch 51 is triggered to the on condition the first charging circuit consisting of 51, coil 53 composite current sensing resistance 65, 67 ammeter 63 and the unregulated supply is effective to charge the battery and the loading coil 53.

When switch 51 is triggered to off condition, the second charging circuit, which comprises the energized coil 53, the diode 55, the composite current sensing resistance 65, 67 and the ammeter 63, becomes effective to deliver current from the coil to the battery until the switch 51 is triggered to on condition.

A voltmeter 57 indicates the voltage at the charging terminals 59, 61 for the battery.

The voltage drop across the current sensing resistance serves as a measure of the instantaneous charging current. This voltage drop is added to a regulated reference voltage, variations from the total of which serve as error signals which activate the Schmitt trigger and in turn the electronic switch 51 to either on or off condition. The reference voltage for this purpose is provided by a circuit leading from the negative output of the supply through resistor 13, thence through potentiometer 19 and resistor 23, with Zener 21 bridging 19 and 23 to provide a fixed total drop across 19 and 23. The slide of the potentiometer 19 is connected to the inverting input terminal of an operational amplifier 35 which forms a portion of the Schmitt trigger.

The noninverting input terminal of the operational amplifier is connected through a resistor 29 to a reference potential. The potential at the inverting input of 35 can be adjusted by the slide of potentiometer 19 to equal the potential at the point common to Zeners 27, 31 for a selected constant mean current level passing through the current sensing resistance 65, 67. For example, assume that resistor 65 is 1.25 ohms and resistor 67 is 0.139 ohms so that the composite resistance for fast charge is 0.125 ohms, and assume that it is desired to charge at a constant mean level of 8 amperes. The mean IR drop for this mean current level is 0.125×8 or −1.0 volt relative to ground. The slide of potentiometer 19 is adjusted so that the negative potential added to −1.0 volt by the potentiometer 19 is equal to the potential across Zener 27. Resistor 17 limits the current through Zeners 27 and 31.

If it were desired to charge at a mean of 16 amps instead of 8 amps, the slide of potentiometer 19 would be adjusted to add a lesser negative value to the mean drop from the current sensing resistance which is now −2.0 volt, such that for the mean current of 16 amperes the potential at inverting input is again equal to the reference voltage for the noninverting input.

Instead of adjusting the constant mean current level by the slide of the potentiometer 19, the latter can be made fixed and resistors 65 and 67 made adjustable to adjust the level of mean constant charging current.

Variations from mean current level through the sensing resistance 65, 67 form error signals of voltage which potentialize the inverting input of amplifier 35 to values above or below the reference voltage for the noninverting input and cause the trigger action now to be described. The triggering can be such that if the potential at the inverting input rises above or falls below the potential to which the noninverting input is referenced, i.e., the point common to 31 and 27, by say 0.05 volt, triggering will occur.

A regulated negative supply voltage is provided for the amplifier 35 via a connection between resistor 17 and Zener 31, the positive supply terminal being grounded as shown. A feedback from the output of the amplifier 35 to the noninverting input is provided through resistor 33 and 29 to form the Schmitt trigger. Thus when the potential at the inverting input goes 0.05 volt negative relative to the mean, indicating that the charging current has increased to a point requiring cutoff of the first charging circuit, the output of 35 changes to a less negative potential which is maintained until the potential at inverting input goes 0.05 volt positive relative to the mean. When the inverting input goes 0.05 volt positive relative to the mean, indicating that the charging current has dropped to a point requiring cut-on of the first charging circuit, the output of 35 changes to a more negative potential which is maintained until the potential at inverting input again goes negative by 0.05 volt.

The output of amplifier 35 is connected through a current limiting resistor 37 to the base of transistor 41 which has a reverse-bias limiting diode 39, the latter being connected to the connection between Zener 25 and resistor 15 as shown. The transistor 41 has its collector connected through resistors 43 and 45 to the negative supply as shown. The connection between 43 and 45 is connected to the base of transistor 47 whose emitter is connected through resistor 49 to the negative supply and to the base of transistor 51. Transistor 51 in combination with transistor 47 form a Darlington configuration.

Summarizing the triggering action, when inverting input of 35 goes negative by 0.005 volt relative to the mean, due to a rise in current through current sensing resistance 65, 67, the output of 35 becomes less negative, the transistors 41, 47 and 51 cease to pass current, and the loading coil 53 becomes effective to charge the battery. When the inverting input goes positive by 0.05 volt relative to the mean, due to a fall in current through current sensing resistance 65, 67, the output of 35 becomes more negative and transistors 41, 47, and 51 pass current to thereby render the DC supply effective to charge the battery and to replenish the energy of the loading coil 53.

The composite current sensing resistance 65, 67 is arranged so that resistor 67 is in shunt with resistor 65 for fast charge and so that a relay switch 69a removes resistor 67 from shunt relation for trickle charge. The relay switch 69a is opened by relay coil 69 when the battery reaches near-full-charge voltage. Relay coil 69 is controlled by the following circuitry:

A small transformer 71 supplied by unregulated 117 volts AC has its output rectified by diodes 73, 75, 77 and 79 and filtered by capacitor 81. The negative output terminal of this supply is connected through resistor 103, relay coil 69, transistor 111, and Zener 93 to the positive terminal of the supply to form the energizing circuit for the coil 69 when the transistor 111 is in the on condition. Resistor 85 provides current through Zener 93 when transistor 111 is off thereby maintaining the reference potential. Diode 105 serves to discharge coil 69 when transistor 111 is switched off.

The negative terminal 59 for the battery is connected through a resistor 83 and a potentiometer 89 to the positive output terminal of the battery 61 to form a voltage divider circuit across the battery, the voltage at the slide of the potentiometer being adjustable and being supplied to the inverting input terminal of the operational amplifier 99. The noninverting input terminal of the operational amplifier 99 is connected through resistor 97 to the junction of Zeners 91 and 95 which are in series with resistor 87 across the supply. Amplifier 99 has its positive supply terminal connected to the positive side of the supply and its negative supply terminal connected to the connection of Zener 91 and resistor 87.

Feedback to the noninverting input of amplifier 99 is provided by resistor 101 and 97 the former being connected between the output of 99 and its noninverting input terminal.

The output of 99 is connected through resistor 107 to the base of transistor 111, diode 109 functioning to limit the reverse bias potential of the emitter-base junction of 111.

With the connections as shown, the slide of potentiometer 89 can be adjusted to a mean battery voltage, variations from which will cause the amplifier 99 to respond as a Schmitt trigger, in the same manner as amplifier 35, to trigger transistor 111 to on or off condition thereby energizing or deenergizing coil 69, whereby the relay switch 69a closes or opens to respectively shunt or unshunt resistor 65 by resistor 67. Upon unshunting of resistor 65, the charging current is reduced to trickle charge rate. Concurrently, coil 69 operates a double contact switch 69b to deenergize a red signal 113 indicative of fast charge and to energize a green signal 115 indicative of trickle charge, these signals being energized by 117 V.A.C. through a resistor 117.

If during trickle charge the battery voltage should drop by an amount necessary to trigger the transistor 111 to on condition, the coil 69 will be energized and resistor 67 will again shunt resistor 65 so that fast charge will be resumed. The voltage drop necessary for this purpose can be of the order of a fraction of a volt (0.1 volt) per cell.

It will be noted that the near-full-charge battery voltage to which the amplifier 99 of FIG. 3 is to respond cannot be less than the voltage drop of Zener 95. This means that the battery voltage sensing portion of FIG. 3 can be used only for batteries having a voltage rating above that of Zener 95. In order to respond to batteries of lower voltage rating, as for example a single nickel-cadmium cell, the modification shown in FIG. 4 should be used.

Figure 4:
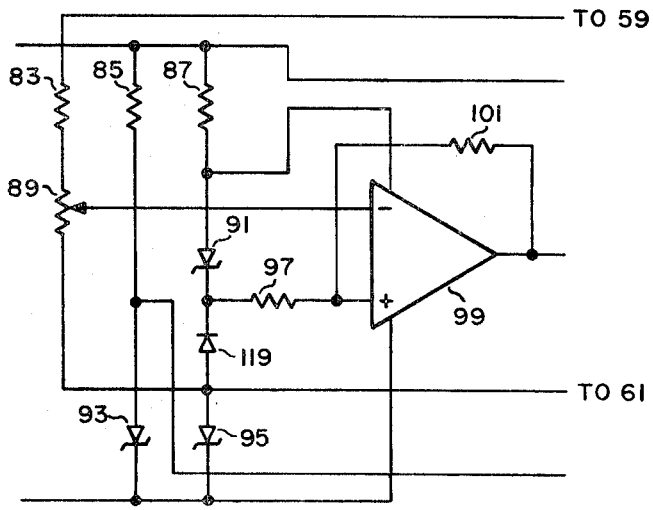
FIG. 4 is a modification of a portion of the circuitry of FIG. 3.

The arrangement of elements in FIG. 4 is the same as in the voltage sensing portion of FIG. 3 except that a diode 119 has been added between Zener 91 and Zener 95 and resistors 101 and 97 are changed to lower the hysteresis. Instead of the connection between the positive terminal 61 to the positive side of Zener 95, as in FIG. 3, this connection is made in FIG. 4 to the junction between Zener 95 and diode 119. Also the positive end of potentiometer 89 is connected to this junction with connections as in FIG. 4, the potentiometer 89 can be adjusted so that the amplifier 99 will respond as a Schmitt trigger when only a single cell under charge has reached a near-full-charge voltage.

The following identifications of elements of the circuitry of FIG. 3 are given as an example of those found suitable for the safe and efficient charging of a 36 volt nickel-cadmium battery at a fast charge of 8 amperes and a trickle charge of 0.8 amperes with a latitude for charging batteries of higher and lower voltages and at greater or lower mean constant currents.

| Element of FIG. 3 | Rating or manufacturer's designation |
| --- | --- |
| transformer 1 | 117-50v.,500 watt |
| transformer 71 | 117-50v.,50 watt |
| capacitor 11 | 22,000 μf., 75w.DC |
| capacitor 81 | 500 μf., 75w.DC |
| diodes 3, 5, 7, 9 | 1N4436/T |
| diode 55 | 1N3209 |
| diodes 39, 109 | 1N457 |
| diodes 73, 75, 77, 79, 105 | 1N4001 |
| resistor 13 | 3.3K ohms, 1w. |
| resistors 33, 101 | 3.3K ohms, ½w. |
| resistors 15, 85 | 3.6K ohms, 1w. |
| resistors 17, 87 | 1.1K ohms, 1w. |
| resistor 29 | 162 ohms, ½w. |
| resistor 97 | 150 ohms, ½w. |
| resistors 37, 107 | 5.1K ohms, ½w. |
| resistors 23, 83 | 11K ohms, ½w. |
| resistor 117 | 200K ohms |
| resistor 43 | 430 ohms, 2w. |
| voltmeter 57 | 0–50v. |
| ammeter 63 | 0– 10a. |
| resistor 45 | 1K ohms, ½w. |
| resistor 49 | 470 ohms, ½w. |
| resistor 103 | 130 ohms, 2w. |
| resistor 65 | 1.25 ohms, 2w. |
| resistor 67 | 0.139 ohms, 15w. |

Table—Continued

| | |
|---|---|
| potentiometers 19, 89 | 10K ohms |
| operational amplifiers 35, 99 | uA741C |
| Zeners 25, 27, 31, 91, 93, 95 | 1N4743 |
| Zener 21 | 1N5245 |
| transistors 47, 51 | 2N3055 |
| transistor 111, 41 | 2N4235 |
| Loading coil 53 | 30 mh., 0.20 ohms |
| Relay with coil 69 | ABC11D, 24 v. |
| Signals 113, 115 | NE2 |

While the foregoing are examples of specific circuitry and components, it will be understood by those skilled in the art that the invention is not limited thereto and may be practiced with other kinds of components of equivalent capability.

I claim:
1. Battery charging circuitry comprising:
   A. a source of DC power supply;
   B. a circuit including in series an electronic switch, a loading coil, terminals for a battery to be charged, a current sensing resistance, and said source of supply, to form a first fast charging circuit when the electronic switch is in on condition;
   C. a diode connected in bridging relation to that portion of the first charging circuit which includes the loading coil, the terminals of the battery to be charged, and said current sensing resistance, to form a second fast charging circuit utilizing stored energy of the loading coil when said electronic switch is in off condition; and
   D. electronic circuit means responsive to a predetermined current increase or decrease to respectively trigger said electronic switch to an off condition or an on condition, whereby a constant mean fast charging current through a battery connected to said terminals is maintained.

2. The battery charging circuitry of claim 1, which includes adjustable means to determine the current level through said resistance relative to which said current increase and current decrease occur.

3. The battery charging circuitry of claim 1 in combination with means responsive to voltage across said terminals indicative of near-full-charge to increase the magnitude of said resistance and thereby reduce the constant mean fast charging current to a constant mean trickle charging current.

4. The battery charging circuitry of claim 3 including means to change the magnitude of said resistance back to its initial value upon a predetermined drop in said voltage, whereby fast charging is resumed.

5. The battery charging circuitry of claim 4 which includes adjustable means to determine the mean voltage level relative to which said voltage drop occurs.